UNITED STATES PATENT OFFICE.

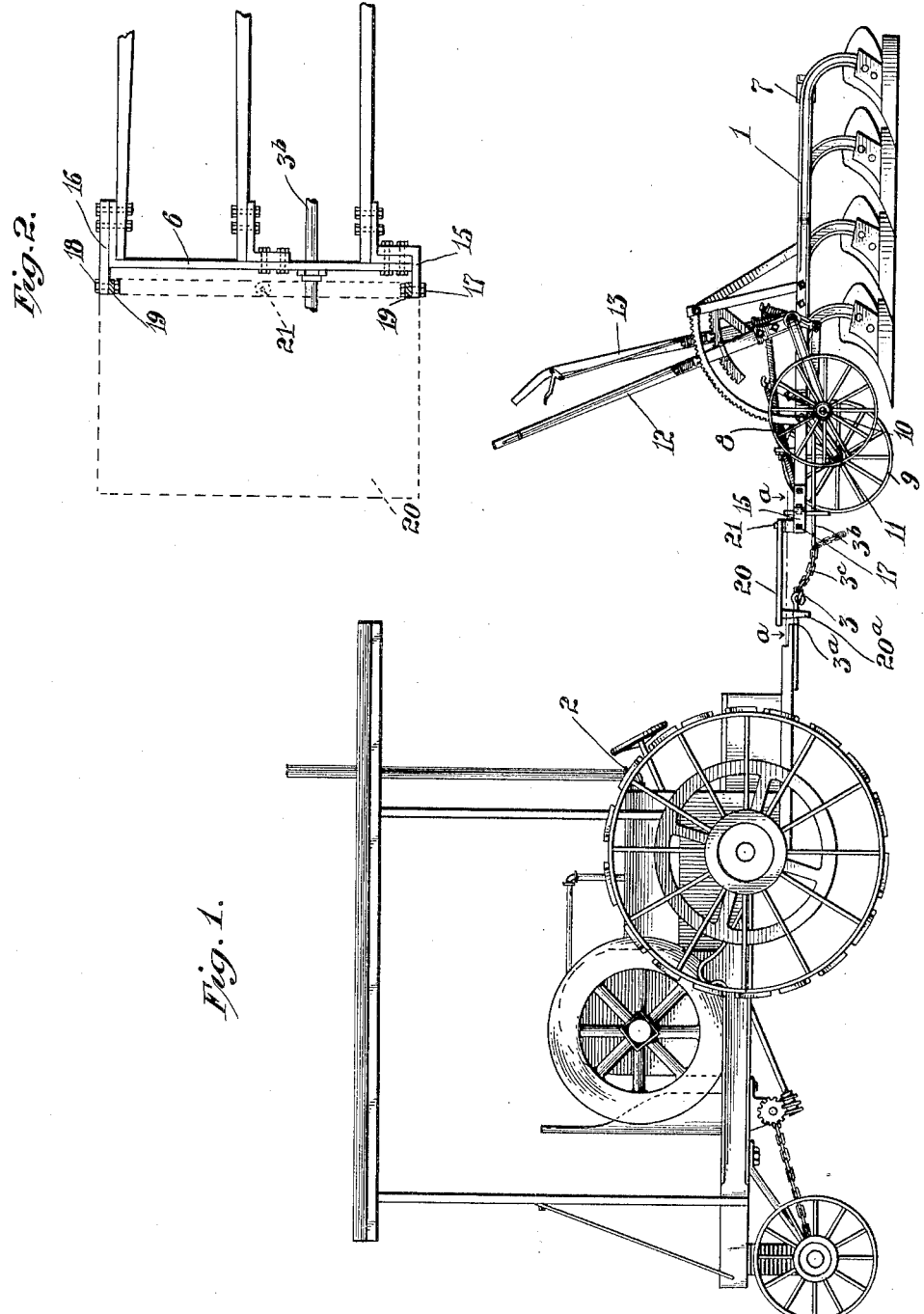

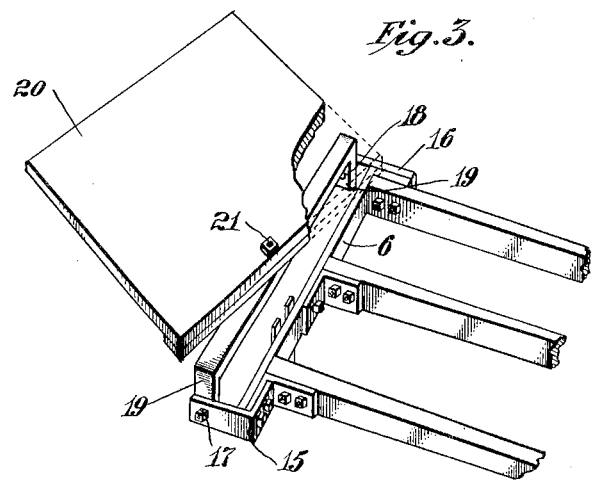
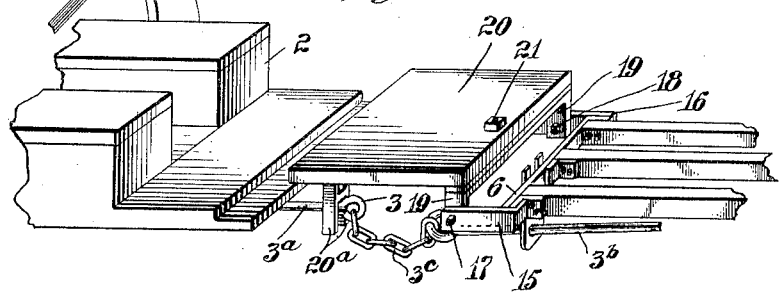
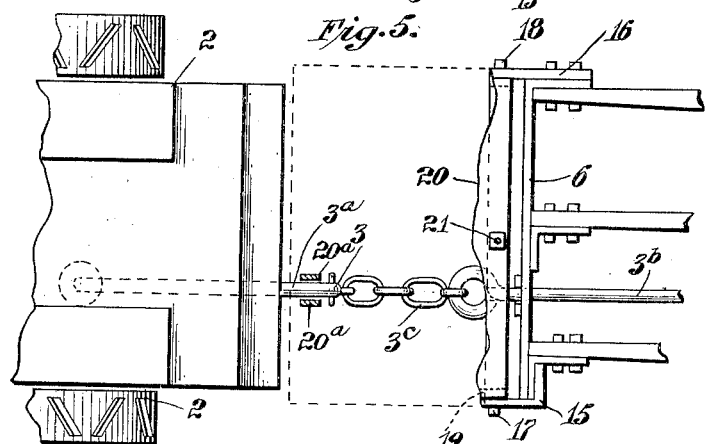

ALEXUS C. LINDGREN, OF MOLINE, ILLINOIS, ASSIGNOR TO MOLINE PLOW COMPANY, A CORPORATION OF ILLINOIS.

TRACTION-PLOW.

1,099,456.  Specification of Letters Patent.  Patented June 9, 1914.

Application filed June 30, 1911. Serial No. 636,143.

*To all whom it may concern:*

Be it known that I, ALEXUS C. LINDGREN, a citizen of the United States, residing at Moline, in the county of Rock Island and State of Illinois, have invented certain new and useful Improvements in Traction-Plows, of which the following is a specification, reference being had therein to the accompanying drawing.

This invention relates to gang plows adapted to be drawn through the field by a tractor, and the invention has special reference to the provision of a platform between the plow and tractor on which the attendant or operator may stand and from which he may reach and operate the controlling devices of both the plow and tractor.

The invention consists in so mounting and sustaining the platform that it may shift laterally with reference to the plow when the tractor is turned in guiding or turning the plow; and the invention consists also in providing for an up and down movement of the platform with reference to the plow, so that the platform will maintain a horizontal or substantially horizontal position as the tractor and plow assume relatively angular relations in passing over irregularities in the surface of the ground, such as ridges and hollows.

The invention consists also in means for supporting the platform by the draft device or coupling connecting the plow and tractor; and in means for causing the platform to move laterally with the draft device as the latter shifts horizontally when the tractor turns to turn or guide the plow.

The invention consists also in the details of construction and combination of parts hereinafter described and claimed.

In the accompanying drawings: Figure 1 is a side elevation of a plow having my improved platform applied thereto, and showing the same coupled to a tractor. Fig. 2 is a horizontal sectional elevation on the line *a—a* of Fig. 1, the tractor being omitted. Fig. 3 is a perspective view of the forward end of the plow showing how the platform is connected thereto to move both horizontally and up and down. Fig. 4 is a perspective view showing the rear portion of the tractor and the forward end of the plow, the intermediate platform and the draft device connecting the plow with the tractor. Fig. 5 is a plan view of the same with certain parts broken away to expose other parts to view.

Referring to the drawings: 1 represents a gang plow, 2 a tractor for drawing the same through the field, and 3 a draft device or coupling connecting the plow with the tractor. This draft coupling comprises a draft rod $3^a$ connected with the tractor, a draft rod $3^b$ connected with the plow, and a flexible section $3^c$ in the form of a chain joining the ends of the two draft rods, thereby forming a flexible connection between the plow and tractor so that they may move relatively both vertically and horizontally, in turning curves or in passing over uneven ground.

The plow as shown comprises a number of fore and aft extending beams equipped with suitable mold board plows and connected together at the front by a transverse frame bar 6, and at the rear by a transverse frame bar 7, thereby constituting a rigid frame sustained by a land wheel 8 on one side and a furrow wheel 9 on the opposite side. The two supporting wheels 8 and 9 are carried by axles 10 and 11 respectively, which axles are mounted in the frame and adjusted by suitable levers 12 and 13 extending forwardly toward the front end of the frame, by which means the latter may be raised and lowered to correspondingly elevate and depress the plows.

Extending forwardly from the frame at opposite sides are two bracket plates 15 and 16 between which is mounted on a horizontal transverse axis by means of pivoting bolts 17 and 18, a U-shaped frame 19 to which the rear end of a platform 20 is pivoted on a vertical axis by means of a pivoting bolt 21, whereby said platform may rock relatively to the plow on both a horizontal and a vertical axis, the horizontal axis permitting the platform to move up and down relative to the plow, and the vertical axis permitting it to shift laterally or horizontally. Near its forward end the platform rests on and is supported by the front draft rod $3^a$, and the platform is provided on its under side with depending arms $20^a$ extending on opposite sides of the draft rod, whereby when the tractor is turned to guide the plow, the platform will shift horizontally on its vertical pivoting bolt 21.

By the form and arrangement of the platform as described, the operator may stand between the plow and tractor in a position where he may reach both the plow adjusting levers and the devices which control the tractor, such for instance as the steering wheel and other controlling devices. When the tractor is drawing the plow straight forward, as shown in Fig. 5, the draft rods are in alinement and the platform will extend straight out in front of the plow and bridge the space between the plow and tractor. When the tractor is turned at the end of the furrow or to guide the plow, it will first assume a position angular to the plow by which the draft rod 3ª will be shifted laterally with respect to the plow and will carry the platform with it, the latter turning on the vertical pivoting bolt 21, so that in this turning movement the platform will effectually bridge the space between the plow and tractor, and thus afford a proper and effective standing support for the operator. In passing over uneven ground where hollows and ridges exist, the flexible character of the draft connections between the tractor and plow permit the same to move relatively in a vertical direction and thereby they accommodate themselves to the irregularities. In this relative movement, the platform rests on the draft devices and is permitted to rock to accommodate itself to the changing positions of the parts by reason of the fact that it is pivoted to the plow on a horizontal axis. Furthermore, the pivoting of the platform on a horizontal axis permits the plow frame to be raised and lowered in order to elevate and depress the plows, and this without disturbing the general horizontal supporting position of the platform.

It is manifest that the details of construction shown may be variously modified and changed without departing from the limits of my invention provided that the operation is substantially as indicated above; and it is to be understood that the invention is not limited to any particular form or construction of the parts except in so far as such limitations are specified in the claims.

Having thus described my invention, what I claim is:

1. The combination of a plow, a tractor for propelling the same, an operator's platform connected to one of said parts so as to move horizontally relatively thereto, and bridging the space between them, and a draft device independent of the platform and connected respectively with the plow and tractor.

2. The combination of a plow, a tractor for propelling the same, an operator's platform connected to the plow and movable horizontally relatively to the same and bridging the space between the plow and the tractor, and a draft device independent of the platform and connecting the plow and tractor together.

3. The combination of a plow, a tractor for propelling the same, an operator's platform connected to the plow and movable relatively to the same about a vertical axis, said platform bridging the space between the plow and tractor, and a draft device independent of the platform and connected respectively with the plow and tractor.

4. The combination of a plow, a tractor for propelling the same, an operator's platform connected to the plow to move relatively thereto both up and down and horizontally, and bridging the space between the plow and tractor, and a draft device independent of the platform and connecting the plow with the tractor.

5. The combination of a plow, a tractor for propelling the same, an operator's platform connected to the plow to move relatively thereto around both a horizontal axis and a vertical axis, said platform bridging the space between the tractor and plow, and a draft device independent of the platform and connected respectively with the plow and tractor.

6. In a plow adapted to be propelled by a tractor, the combination with the main frame, of a secondary frame sustained by and movable relatively to the main frame, and an operator's platform sustained by the secondary frame and movable relatively thereto and adapted to bridge the space between the plow and the tractor.

7. In a plow adapted to be propelled by a tractor, and in combination with the main frame, a secondary frame sustained thereby and movable relatively thereto around an axis, and an operator's platform sustained by said secondary frame and movable in relation thereto around an axis extending at an angle with reference to the axis of the secondary frame, said platform being adapted to bridge the space between the plow and the tractor.

8. In a plow adapted to be propelled by a tractor, and in combination with the main frame, a secondary frame pivoted thereto on a horizontal transverse axis, and an operator's platform sustained by the secondary frame and movable relatively thereto around a vertical axis, said platform being adapted to bridge the space between the plow and the tractor.

9. In combination with a plow, a tractor adapted to propel the same, a draft device connecting the tractor with the plow, and an operator's platform mounted movably on the plow, and supported by and movable relatively to the draft device, said platform bridging the space between the plow and tractor and being so situated as to afford a support from which the operator may control both the plow and tractor.

10. In combination with the plow, a tractor adapted to propel the same, a draft device connecting the tractor with the plow, and an operator's platform connected with the plow to move relatively thereto up and down, and supported by and movable relatively to the draft coupling, the said platform bridging the space between the plow and tractor and being so situated as to afford a support from which the operator may control both the plow and tractor.

11. In combination with a plow, a tractor, a draft device connecting the two and movable horizontally relatively to the plow in guiding the latter, and a platform sustained by the plow and bridging the space between the plow and tractor, said platform being movably supported by the draft device, and being movable horizontally relatively to the plow.

12. In combination with a plow, a tractor adapted to propel the same, a flexible draft coupling connecting the two, and an operator's platform flexibly connected with the plow and receiving support from the draft coupling, said platform bridging the space between the plow and tractor and situated so as to afford a support from which the operator may control both the tractor and the plow.

13. In combination with a plow, a tractor, a draft device connecting the two, and a platform sustained by the plow and provided with means adapted to engage the draft device on opposite sides.

14. In combination with a plow, a tractor, a draft coupling connecting the two, a platform connected with the plow, and depending arms on the platform extending on opposite sides of the draft device.

15. In combination with a plow, a tractor, a draft device connecting the two, a platform connected with the plow and movable up and down relatively thereto and movable also horizontally relatively to the plow, and arms depending from the platform and extending on opposite sides of the draft device.

16. In combination with a plow, a tractor, a draft device connecting the two and movable laterally relative to the plow in turning, and a platform connected at its rear portion to the plow to rock on both a horizontal and a vertical axis, and sustained at its front portion by the draft device to move with the latter.

In testimony whereof I affix my signature in presence of two witnesses.

ALEXUS C. LINDGREN.

Witnesses:
L. C. BLANDING,
JAMES J. LAMB.

---

Copies of this patent may be obtained for five cents each, by addressing the "Commissioner of Patents. Washington, D. C."